(12) United States Patent
Ellis

(10) Patent No.: US 6,385,003 B1
(45) Date of Patent: May 7, 2002

(54) CARTRIDGE PICKER FOR AUTOMATED LIBRARY

(75) Inventor: John Ellis, Louisville, CO (US)

(73) Assignee: Exabye Corporation, Boulder, CO (US)

( * ) Notice: Subject to any disclaimer, the term of this patent is extended or adjusted under 35 U.S.C. 154(b) by 17 days.

(21) Appl. No.: 09/628,410

(22) Filed: Aug. 1, 2000

Related U.S. Application Data

(60) Provisional application No. 60/184,828, filed on Feb. 24, 2000.

(51) Int. Cl.[7] ............................................... G11B 15/68
(52) U.S. Cl. ......................................................... 360/92
(58) Field of Search ................................ 360/92, 98.06; 369/34, 191

(56) References Cited

U.S. PATENT DOCUMENTS

| | | |
|---|---|---|
| 4,972,277 A | 11/1990 | Sills et al. |
| 4,984,106 A | 1/1991 | Herger et al. |
| 5,059,772 A | 10/1991 | Younglove |
| 5,237,467 A | 8/1993 | Marlowe |
| 5,402,283 A | 3/1995 | Yamakawa et al. |
| 5,416,653 A | 5/1995 | Marlowe |
| 5,450,391 A * | 9/1995 | Pollard ........................ 360/92 |
| 5,487,579 A | 1/1996 | Woodruff |
| 5,498,116 A | 3/1996 | Woodruff et al. |
| 5,691,859 A | 11/1997 | Ulrich et al. |
| 5,739,978 A | 4/1998 | Ellis et al. |
| 6,005,745 A | 12/1999 | Filkins et al. |
| 6,008,964 A | 12/1999 | Goodknight et al. |

* cited by examiner

Primary Examiner—Robert S. Tupper
(74) Attorney, Agent, or Firm—Nixon & Vanderhye, P.C.

(57) ABSTRACT

A cartridge picker uses only one picker drive motor (4) to perform all of the following operations: [1] open and close gripper fingers (8); (2) translate a cartridge (3) in and out of a storage slot in a library (e.g., magazine or the like) or tape drive (2); and [3] push the cartridge (3) into the tape drive (below the flush plane of the drive bezel).

5 Claims, 12 Drawing Sheets

CARTRIDGE PICKER FOR AUTOMATED LIBRARY

This application claims the benefit and priority of United States provisional patent application Ser. No. 60/184,828, filed Feb. 24, 2000, which is incorporated by reference herein in its entirety.

BACKGROUND

1. Field of the Invention

The present invention pertains to automated libraries which house cartridges of information storage media (such as magnetic tape cartridges, for example), and particularly to a picker mechanism for selectively engaging and transporting such cartridges.

2. Related Art and Other Considerations

The economic and compact storage of information is increasingly important in the computer industry, particularly so as the computer unleashes new potentials in numerous fields such as audio visual and/or multimedia.

In the early days of computers, information requiring storage could be transmitted from a computer to a tape drive, whereat the information was magnetically recorded on or read from a large reel of tape. Upon completion of an operation of recording on the tape, for example, the reel would be removed manually from the tape drive and mounted in a rack. Another reel from the rack could then be manually mounted, if necessary, in the drive for either an input (tape reading) or output (recording to tape) operation.

Eventually it became popular to enclose magnetic tape in a cartridge, the cartridge being considerably smaller than the traditional tape reels. While many persons are familiar with tape cartridges of a type which can be loaded into a "tape deck" for reproduction of audio information (e.g., music), it is not as commonly realized that similar cartridges, although of differing sizes, can be used to store such information as computer data. For years now magnetic tape cartridges have proven to be an efficient and effective medium for data storage, including but not limited to computer back-up.

Large computer systems have need to access numerous cartridges. To this end, automated cartridge handling systems or libraries for cartridges have been proposed for making the cartridges automatically available to the computer. Many of these automated libraries resemble juke boxes. Typically, prior art automated cartridge libraries have an array of storage positions for cartridges, one or more tape drives, and some type of automated changer or cartridge engagement/transport mechanism for picking or gripping a cartridge and moving the cartridge between a storage position and the tape drive.

The following United States patents and patent applications, all commonly assigned herewith and incorporated herein by reference, disclose various configurations of automated cartridge libraries, as well as subcomponents thereof (including cartridge engagement/transport mechanisms and storage racks for housing cartridges):

U.S. Pat. No. 4,984,106 CARTRIDGE LIBRARY SYSTEM AND METHOD OF OPERATION THEREOF

U.S. Pat. No. 4,972,277 for CARTRIDGE LIBRARY

U.S. Pat. No. 5,059,772-READING METHOD AND APPARATUS FOR CARTRIDGE LIBRARY

U.S. Pat. No. 5,237,467 CARTRIDGE HANDLING METHOD AND APPARATUS WITH MOTION-RESPONSIVE EJECTION

U.S. Pat. No. 5,416,653, U.S. patent application Ser. No. 08/062,547 CARTRIDGE HANDLING METHOD AND APPARATUS WITH MOTION-RESPONSIVE EJECTION U.S. Pat. No. 5,487,579 for PICKER MECHANISM FOR DATA CARTRIDGES U.S. Pat. No. 5,498,116 for CARTRIDGE LIBRARY AND METHOD OF OPERATION U.S. Pat. No. 5,607,275 for CARTRIDGE LIBRARY AND METHOD OF OPERATION U.S. Pat. No. 5,718,339 for CARTRIDGE RACK AND LIBRARY FOR ENGAGING SAME U.S. Pat. No. 5,691,859 for CARTRIDGE LIBRARY AND METHOD OF OPERATION U.S. Pat. No. 6,008,964 for CARTRIDGE LIBRARY AND METHOD OF OPERATION THEREOF U.S. patent application Ser. No. 08/970,205 for CARTRIDGE LIBRARY WITH CARTRIDGE LOADER MOUNTED ON MOVEABLE DRIVE ASSEMBLY and U.S. patent application Ser. No. 09/121,541 for CARTRIDGE LIBRARY AND METHOD OF OPERATION disclose, e.g., a cartridge loader which has "flippers" which assist loading and discharge of the cartridge.

Important to the automation of cartridge libraries as previously known has been the provision of the cartridge changer or cartridge engagement/transport mechanism for picking or gripping a cartridge and moving the cartridge between a storage position and the tape drive. Such rotobic mechanisms, often called a cartridge "picker" or "gripper", is typically mounted in a library frame in order to introduce and remove cartridges relative to one or more stationary drives. The stationary drive and the picker are mounted to the same basic frame structure of the library, but otherwise are structurally independent.

U.S. Pat. No. 5,402,283 to Yamakawa shows a gripper which is oriented in the horizontal plane, which is moved by a first motor driven rack and pinion gear train, and which is opened and closed by a separate (second) motor driven gear train with connecting links, thereby requiring a tray and a separate motor driven rack and pinion system for moving the tray.

BRIEF SUMMARY OF THE INVENTION

A cartridge picker uses only one picker drive motor to perform all of the following operations: [1] open and close gripper fingers; (2) translate a cartridge in and out of a storage slot in a library (e.g., magazine or the like) or tape drive; and [3] push the cartridge into the tape drive (below the flush plane of the drive bezel).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
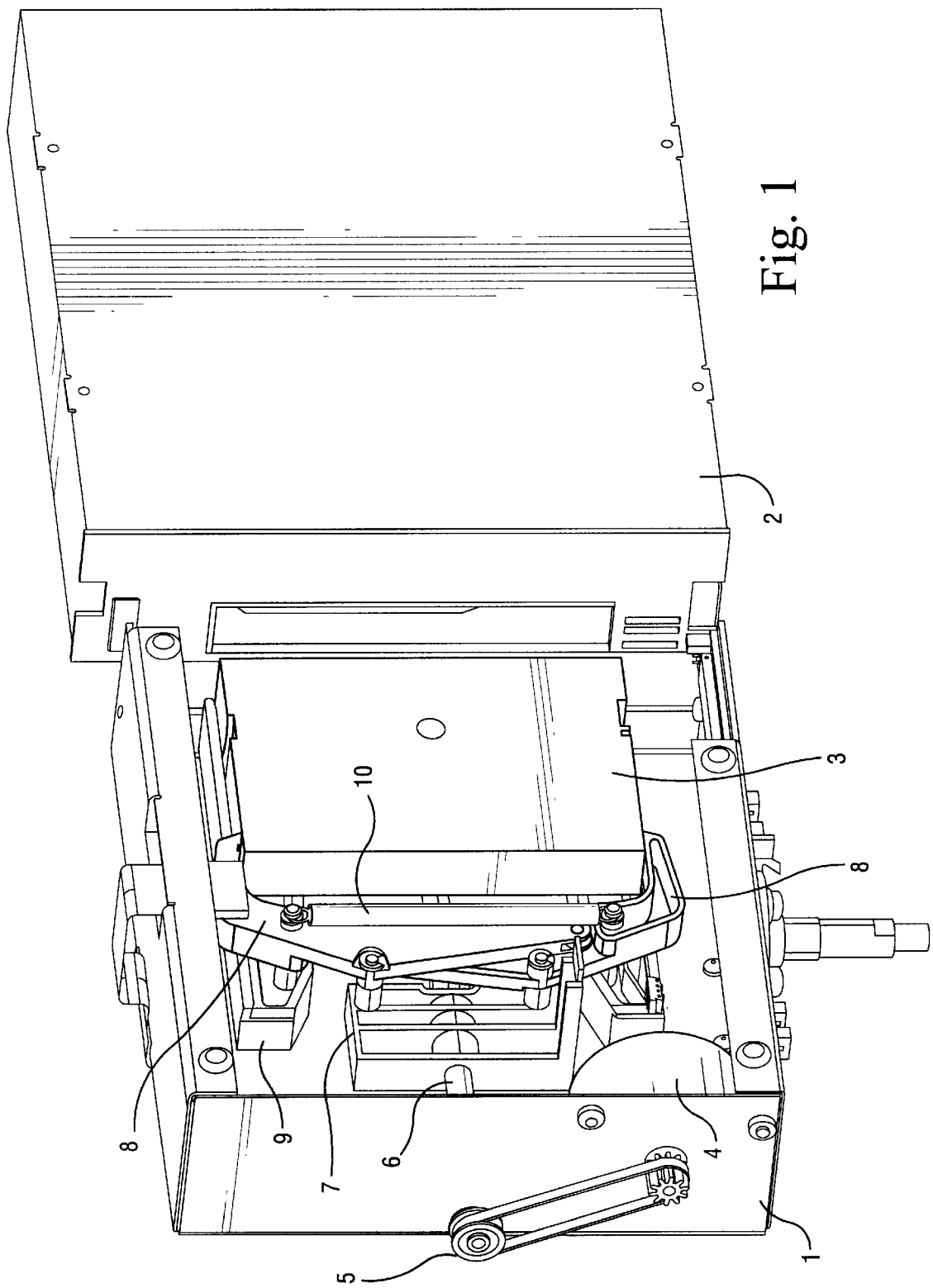
FIG. 1 is a side perspective view showing a cartridge picker according to an embodiment of the invention in a retracted position and engaging a cartridge.
Figure 2:
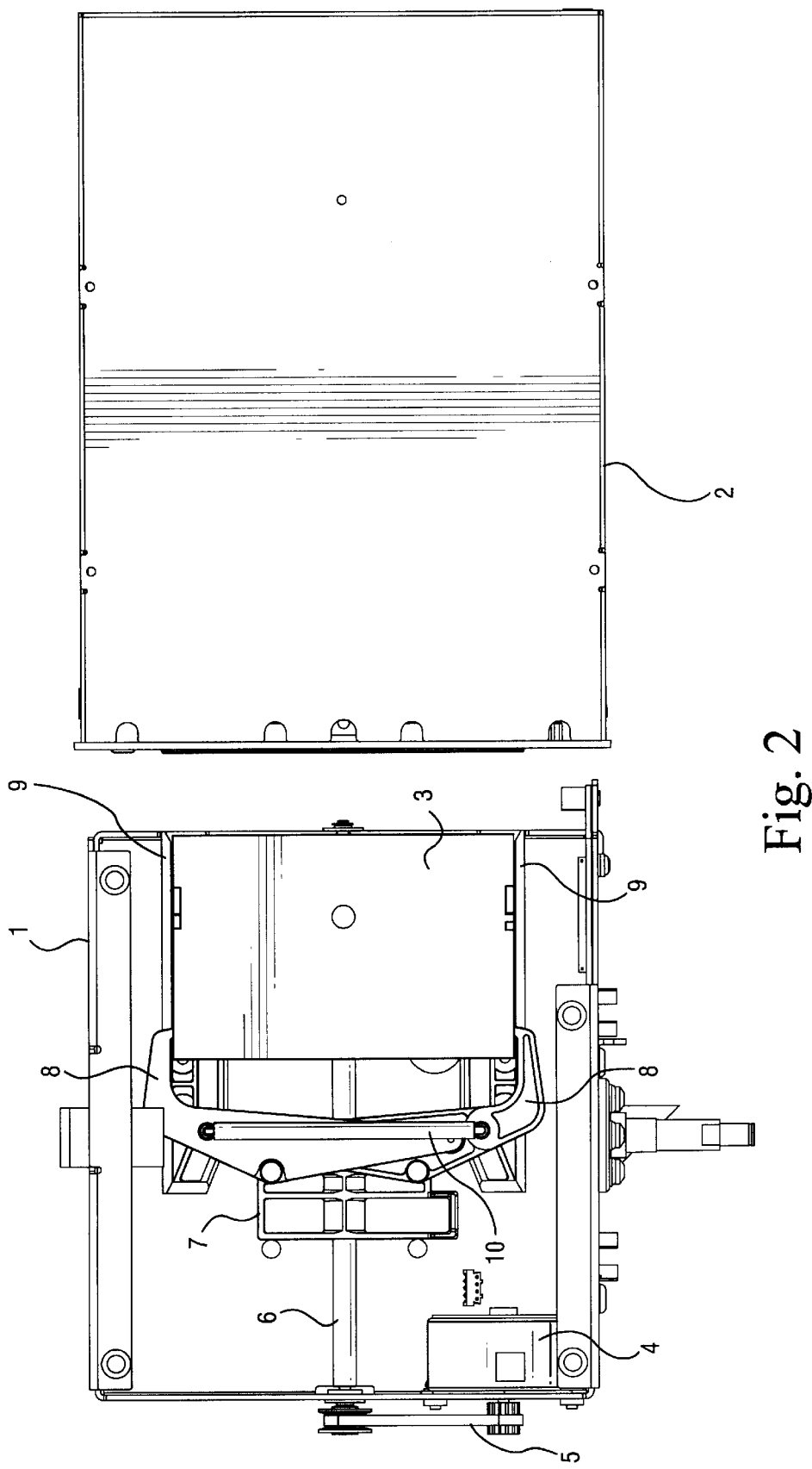
FIG. 2 is a side view of the cartridge picker of FIG. 1 in the retracted position and engaging a cartridge.

FIG. 1 and FIG. 2 show a cartridge picker according to an embodiment of the invention, with the cartridge picker being in a retracted position and engaging a cartridge 3. The cartridge picker includes a sheet metal housing 1 that supports and substantially encloses the cartridge picker. The cartridge picker is shown proximate an information storage drive, such as tape drive 2.

The cartridge picker has a picker drive motor 4 mounted on sheet metal housing 1. In one embodiment, the picker drive motor 4 is a step or stepper motor. An output shaft of picker drive motor 4 engages a drive train 5. In the illustrated embodiment, the drive train 5 comprises a gear train, but also could comprise belt or pulley drive. The drive train 5 transmits motion from picker drive motor 4 to a leadscrew 6. The leadscrew 6 can be, for example, a ¼ inch diameter leadscrew. A leadnut 7 travels on the leadscrew 6 in the direction of the Z axis (see FIG. 1 and FIG. 2).

Two jaw-like gripper fingers 8 are pivotally mounted on leadnut 7. The gripper fingers 8 each have a finger pin 11 mounted thereon for extending in the X direction. First ends of the finger pins 11 of the gripper fingers 8 ridge in a corresponding pair of cartridge guides 9. The cartridge guides 9 are mounted in opposed relation (relative to axis Y) on the sheet metal housing 1 of the cartridge picker. The finger pins 11 of gripper fingers 8 extend through the gripper fingers 8, so that second ends of the finger pins 11 protrude from an opposite side of gripper fingers 8 than the first ends thereof. The second ends of the finger pins 11 of gripper fingers 8 have an extension spring 10 connected therebetween.

Figure 9:
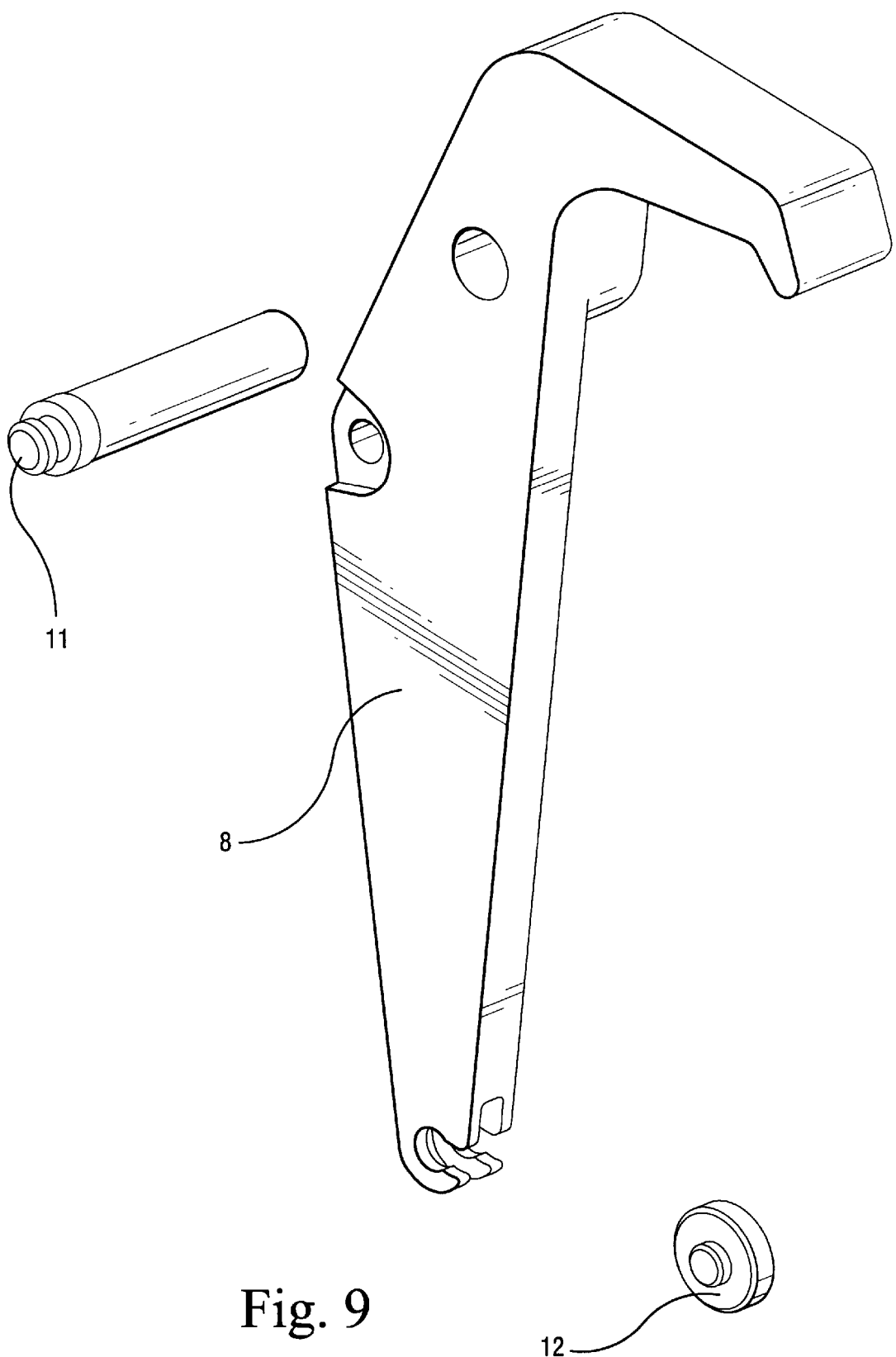
FIG. 9 is an exploded view of a finger assembly of the cartridge picker of FIG. 1.
Figure 10:
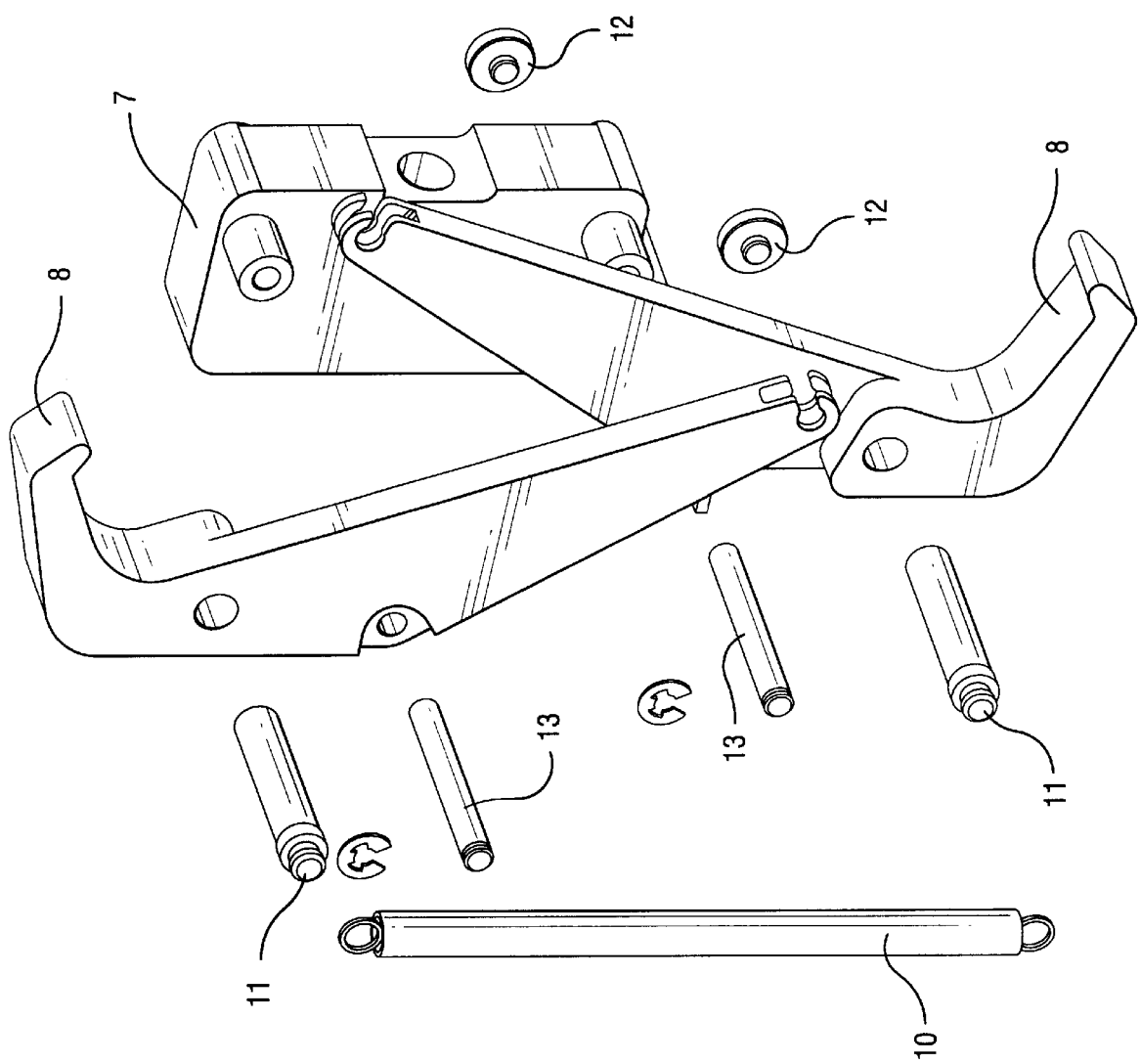
FIG. 10 is an exploded view of a nut assembly of the cartridge picker of FIG. 1.
Figure 11:
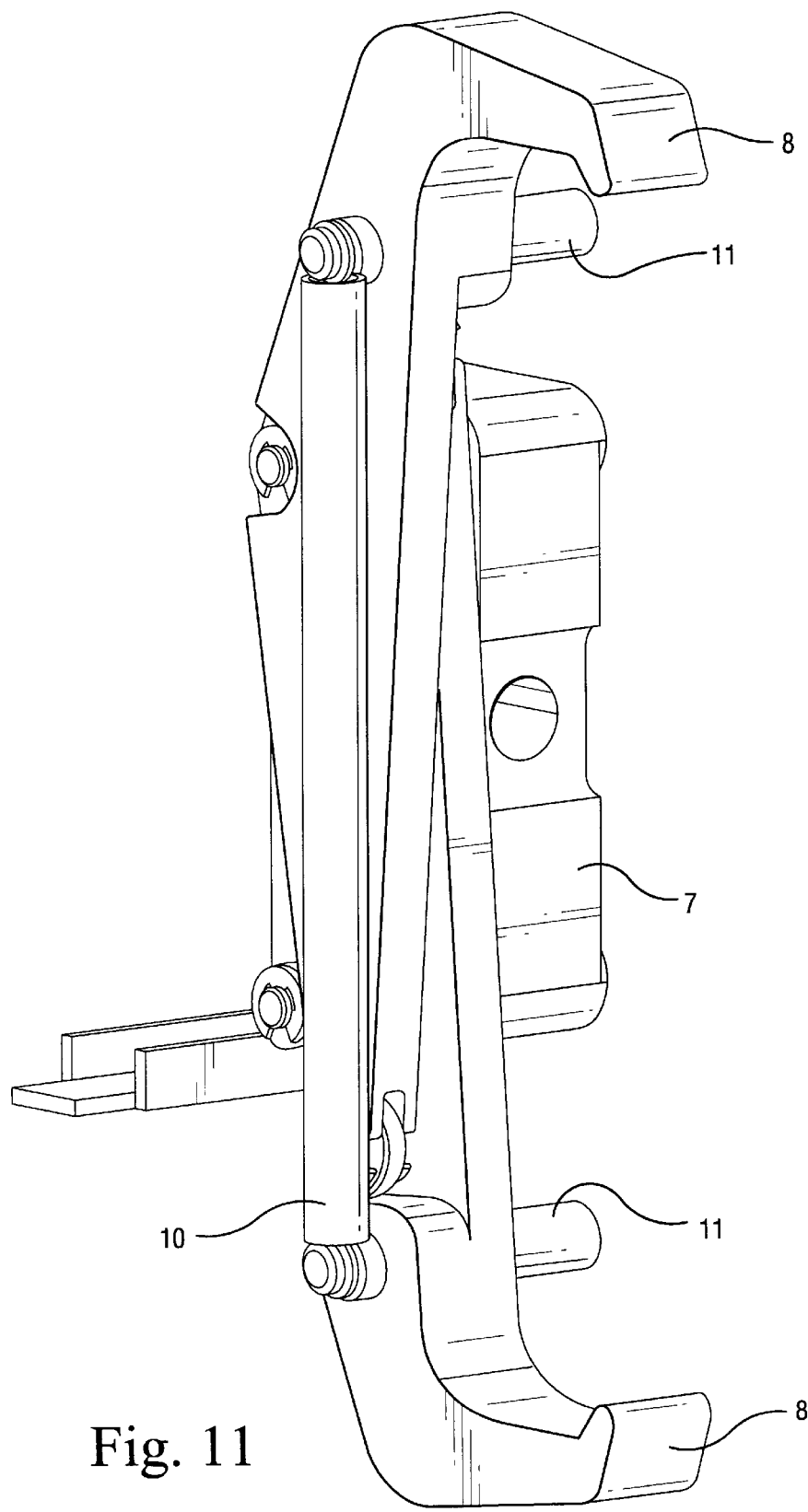
FIG. 11 is a side perspective view of a nut assembly of the cartridge picker of FIG. 1.

The finger pins 11 are shown in exploded fashion relative to gripper finger 8 in FIG. 9. FIG. 9 also shows that the gripper fingers 8 each have a first end which engages a notch in cartridge 3, and a second end which has a roller 12 retained thereon. In addition, as seen in FIG. 10, each of the gripper fingers 8 has pivot pin 13 extending therethrough, about which the respective gripper fingers 8 pivot. The pivot pins 13 are mounted on leadnut 7.

Figure 12:
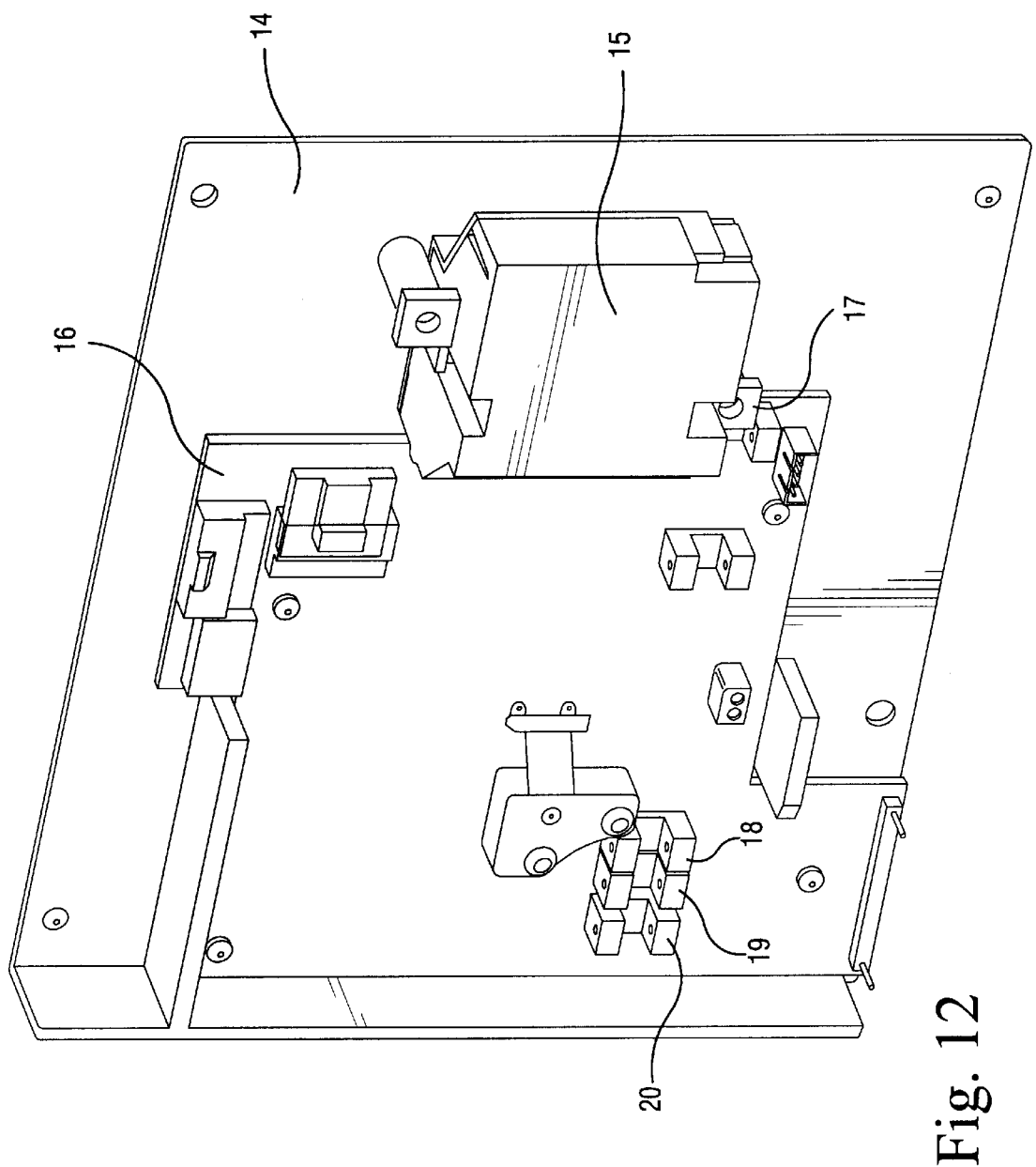
FIG. 12 is side perspective view of a picker cover assembly of the cartridge is picker of FIG. 1.

FIG. 1–FIG. 8 show the cartridge picker with a picker cover 14 thereof removed. FIG. 12 shows a backside of picker cover 14, and the components mounted thereon. Such components include barcode reader 15; picker circuit card 16; picker retraction sensor 17; picker extension sensor 18; picker finger open sensor 19; and load complete sensor 20.

Thus, FIG. 1 shows the cartridge picker with the nearside picker cover 14 removed an a cartridge 3 engaged by the picker. The sheet metal housing 1 supports and encloses the cartridge picker. The cartridge picker is positioned proximate, e.g., in front of, a tape drive 2. The tape drive 2 can be, for example, an 8 mm tape drive such as those manufactured and marketed by Exabyte Corporation. The cartridge picker has been positioned in front of tape drive 2 by mechanisms (not illustrated) which provide translation of the entire cartridge picker assembly in the X and Y axes. The X and Y translation mechanisms are not germane to the present invention, and can be of conventional structure such as those illustrated in various documents already incorporated herein by reference. In FIG. 1, the cartridge 3 is shown within the cartridge picker in a retracted position, i.e., fully contained within the envelope of cartridge picker.

The picker drive motor 4 is attached to the inner rear wall of the sheet metal housing 1. Rotation of picker drive motor 4 transmits motion through drive train 5 to leadscrew 6. Rotation of leadscrew 6 causes leadnut 7 to translate along the Z axis along the length of the cartridge picker. The leadnut 7 is prevented from rotating by contact with the inner wall of sheet metal housing 1.

As leadnut 7 translates forward in the positive Z direction, leadnut 7 carries gripper fingers 8 and cartridge 3 engaged thereby. The gripper fingers 8 are biased closed (against the notches in cartridge 3) by extension spring 10.

Figure 3:
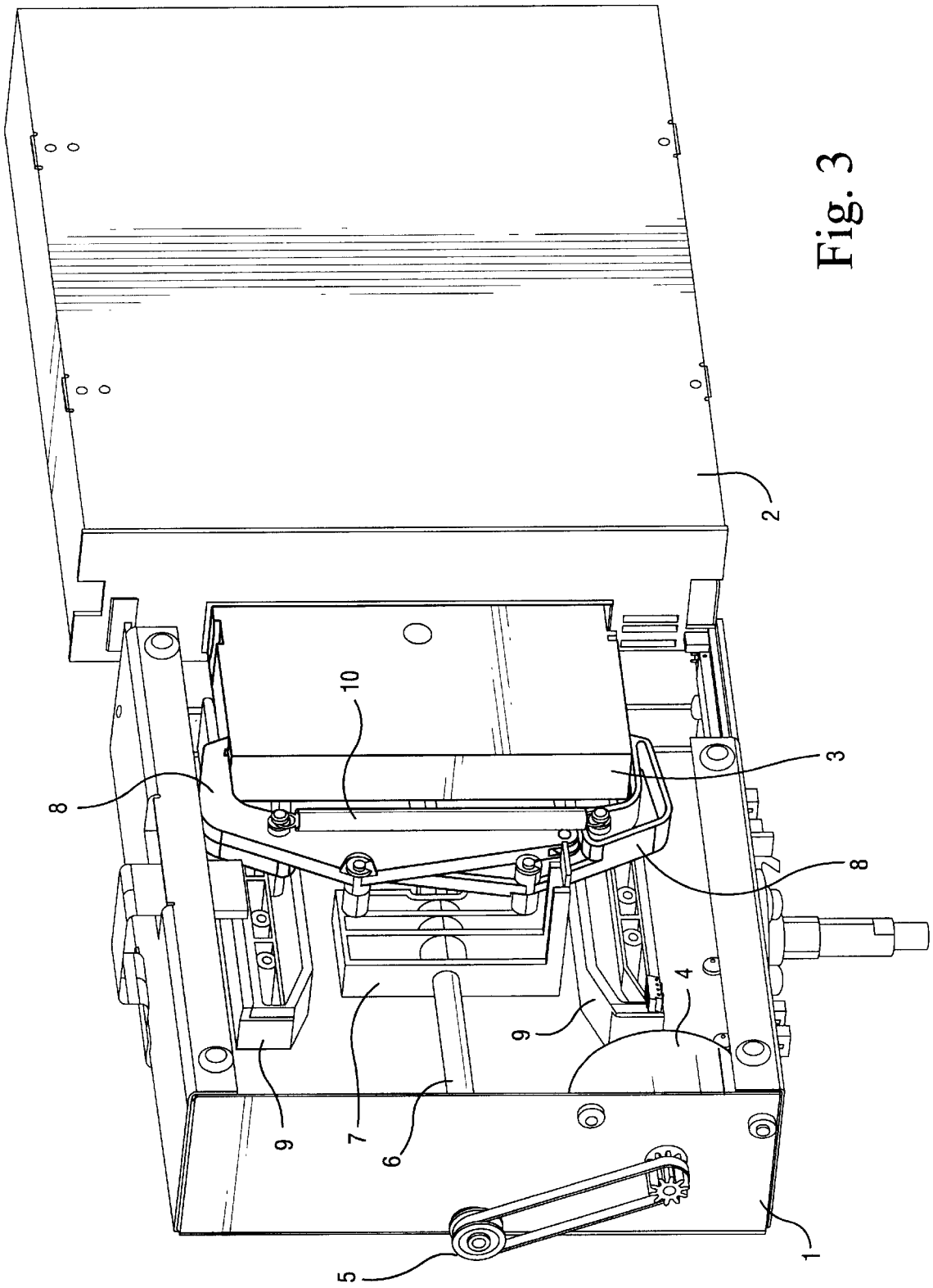
FIG. 3 is a side perspective view showing the cartridge picker of FIG. 1 in an extended position and engaging a cartridge.
Figure 4:
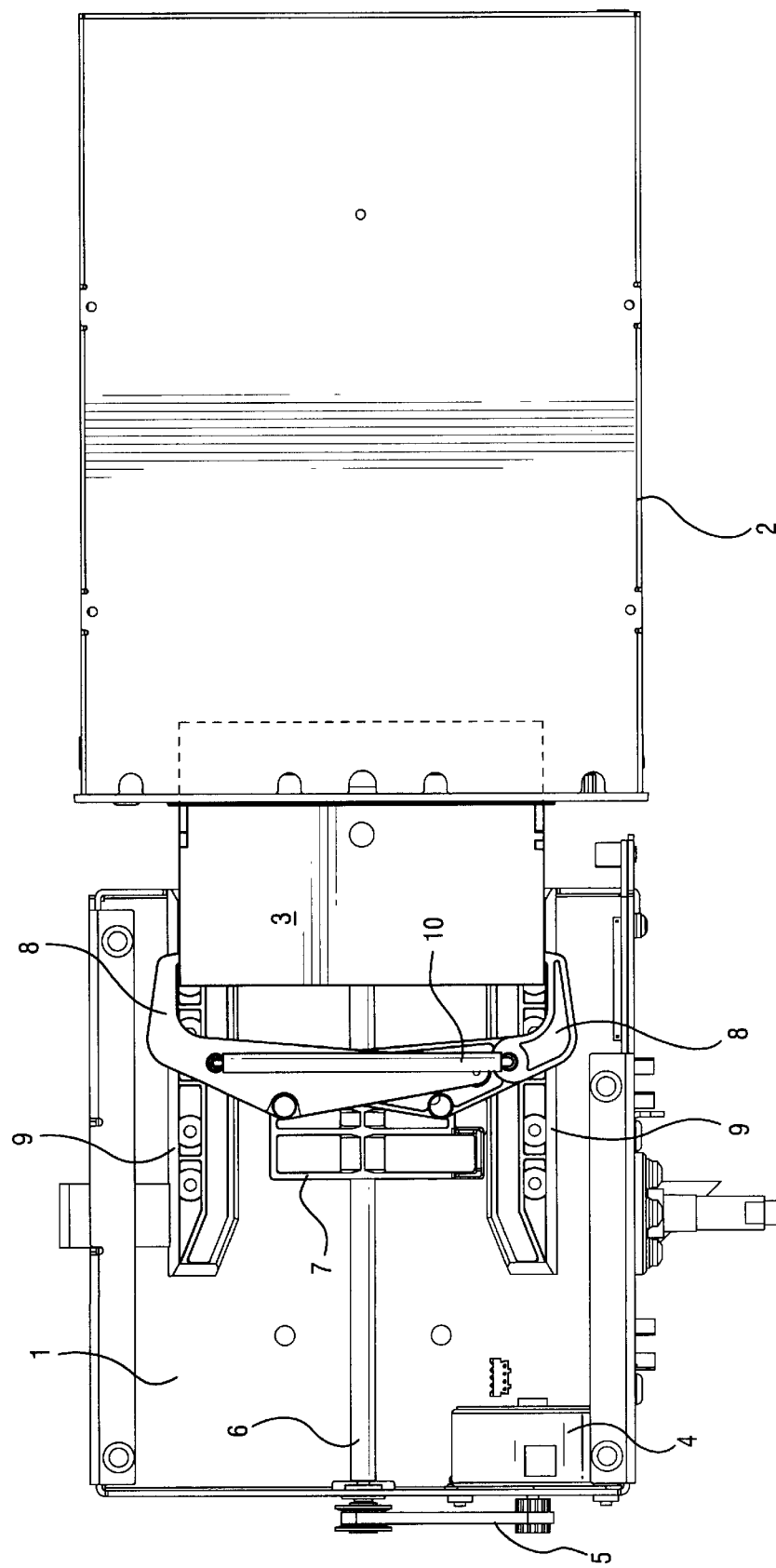
FIG. 4 is a side view of the cartridge picker of FIG. 1 in the extended position and engaging a cartridge.

FIG. 3 and FIG. 4 show the cartridge picker with leadnut 7 advanced to an extended position. At this extended position, the gripper fingers 8 and cartridge 3 engaged thereby have translated as far forward (in the positive Z direction) as they can go. From this extended position, the gripper fingers 8 will start to move apart (e.g., separate or open).

Figure 5:
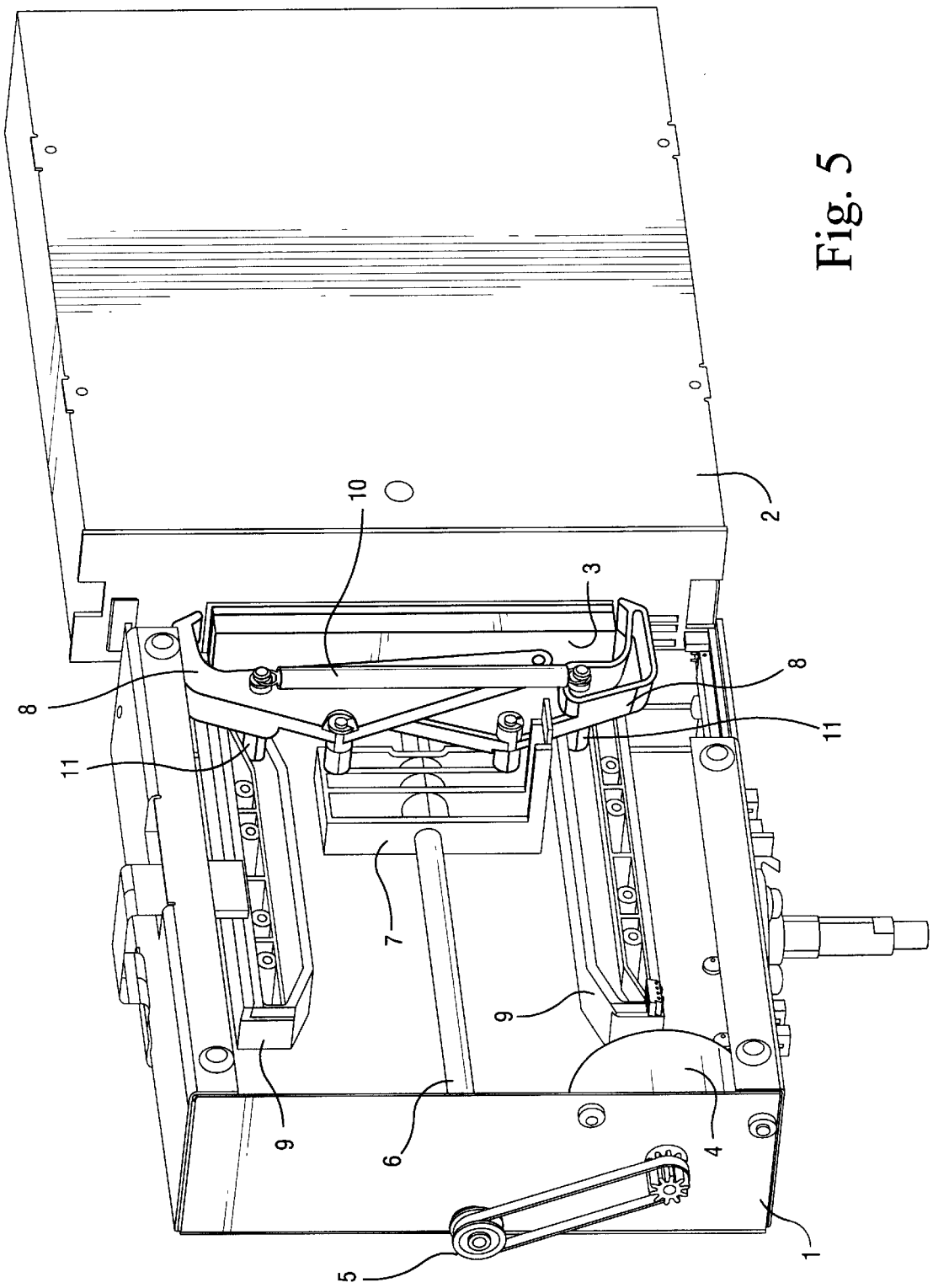
FIG. 5 is a side perspective view of the cartridge picker of FIG. 1 in an open position with opened (separated) gripper fingers.
Figure 6:
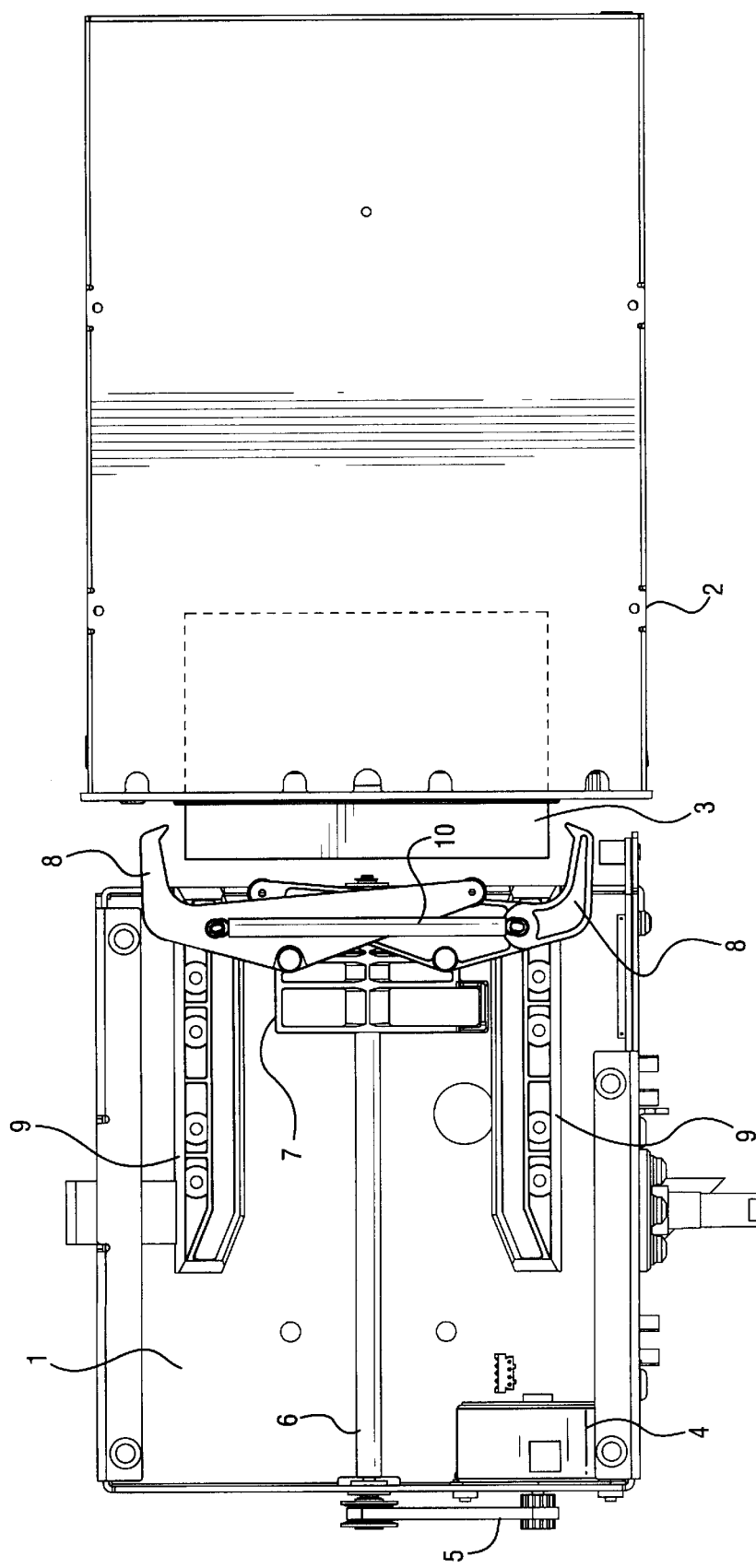
FIG. 6 is a side view of the cartridge picker of FIG. 1 in the open position .

FIG. 5 and FIG. 6 show the cartridge picker with its gripper fingers 8 in an open position. In moving from the extended to the open position, the finger pins 11 encounter a ramped section of cartridge guides 9. The ramped section of cartridge guides 9 cause the 8 to cam open.

Figure 7:
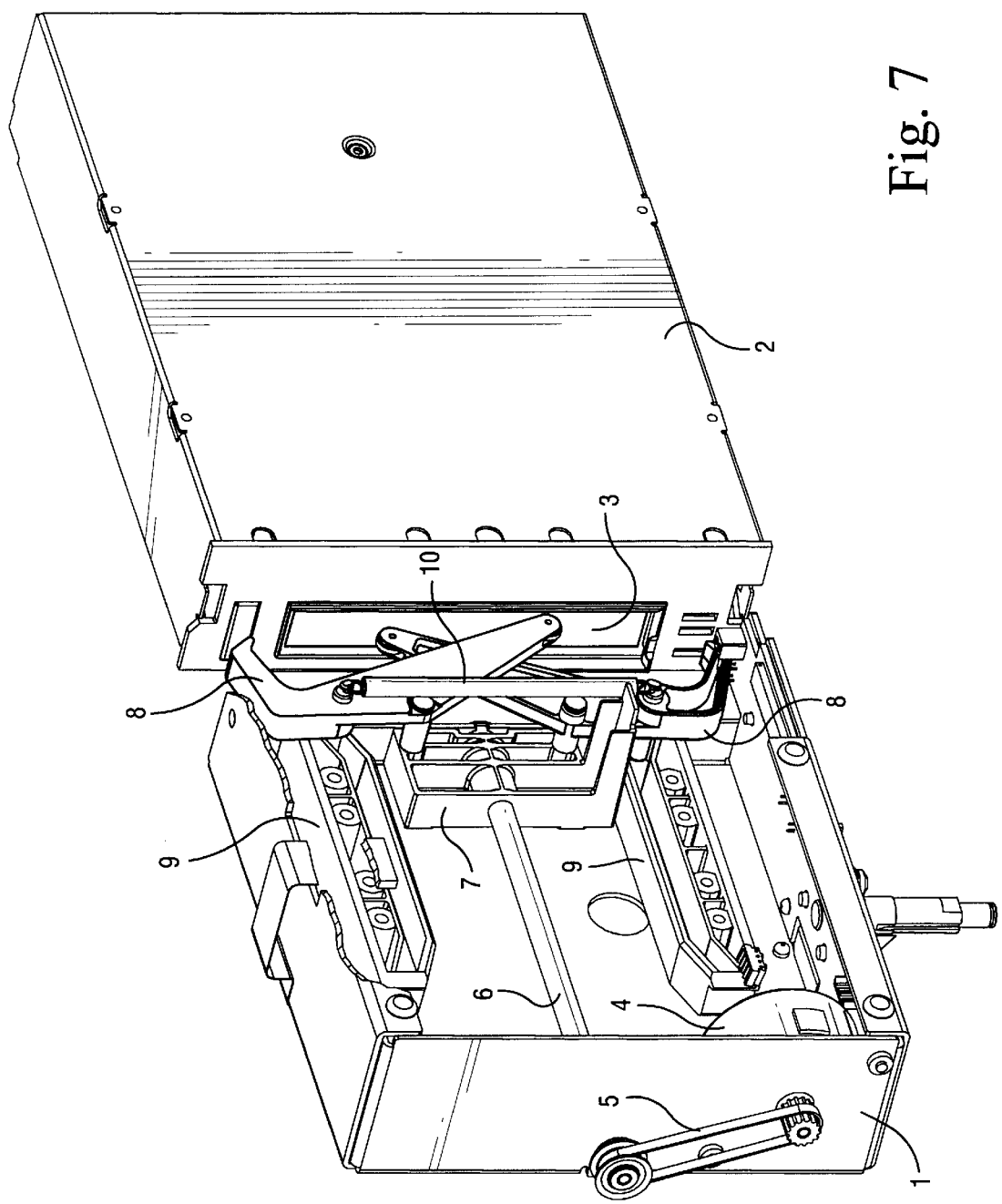
FIG. 7 is a side perspective view of the cartridge picker of FIG. 1 in a load completed position.
Figure 8:
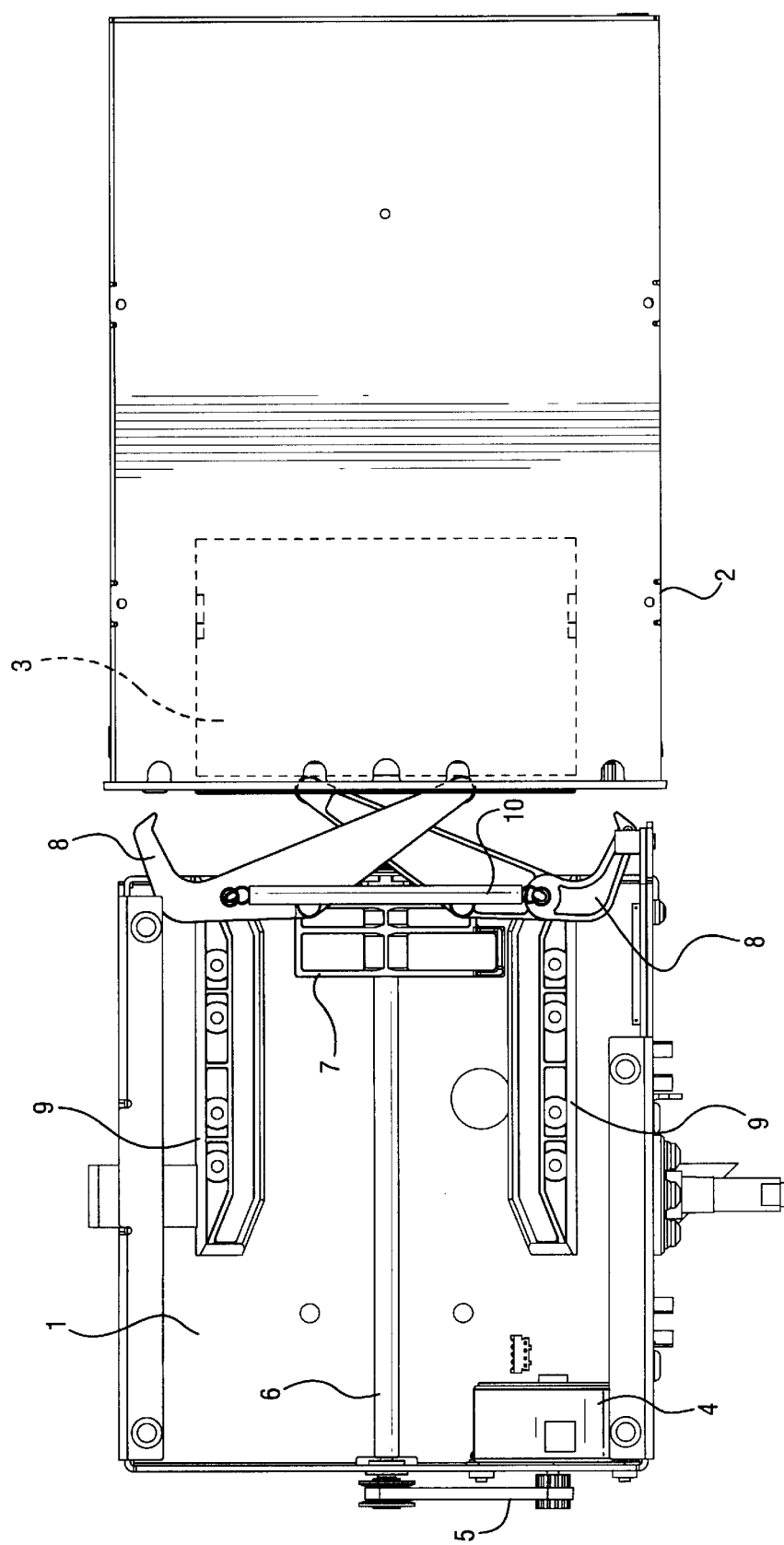
FIG. 8 is a side view of the cartridge picker of FIG. 1 in the load completed position.

FIG. 7 and FIG. 8 show the cartridge picker in a load complete position. The leadnut 7 and gripper fingers 8 have advanced further on leadscrew 6, and the finger pins 11 have moved further up the ramped portions of cartridge guides 9. Such movement causes the gripper fingers 8 to pivot apart further, causing the opposite end of the gripper fingers 8 to move forward, pushing the cartridge 3 into the tape drive 2 (below flush). This motion is advantageous for loading an 8 mm tape drive, for example.

FIG. 9 shows an exploded view of the gripper finger assembly for one of the gripper fingers 8. The finger pins 11 is preferably pressed into the gripper finger 8. The roller 12 snaps into the gripper finger 8. The roller 12 functions to roll (rather than slide) on the label surface of the cartridge 3, thereby preventing marring of the cartridge label. FIG. 9 also shows an upper finger assembly, as well as the lower finger assembly which has the finger rotated 180 degrees (about the Z axis) with the finger pin 11 pressed in from the same side.

FIG. 10 is an exploded view of the leadnut assembly. The gripper fingers 8 are attached to leadnut 7 by pivot pins 13. The pivot pin 13 allow the gripper fingers 8 to pivot about the X axis. The extension spring 10 is attached to near ends of finger pins 11. The opposite ends of finger pins 11 engage the ramped portion of cartridge guides 9, as described above.

The picker cover 14, shown in FIG. 12, also serves to guide the cartridge 3. The barcode reader 15 is attached to the interior side of picker cover 14. The barcode reader 15 permits reading of barcode labels attached to cartridge 3. The picker circuit card 16 holds the power and control circuitry for the cartridge picker. A series of slotted optical sensors send the position of leadnut 7. The picker retraction sensor 17 senses the retracted position of the cartridge picker; picker extension sensor 18 senses the extended position; picker finger open sensor 19 sense the open position; and load complete sensor 20 senses the load complete position.

Advantageously, the cartridge picker of the present invention uses only one inexpensive picker drive motor 4 to perform all of the following operations: (1) open and close the gripper fingers 8; (2) translate the cartridge 3 in and out of a storage slot in a library (e.g., magazine or the like) or tape drive 2; (3) push the cartridge 3 into the tape drive 2 (below the flush plane of the drive bezel).

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A cartridge picker which selectively loads a cartridge of magnetic tape into a tape drive in a cartridge loading operation and unloads the cartridge from the tape drive during a cartridge unloading operation, the cartridge picker comprising:

a picker housing;

a pair of cartridge guides formed on the picker housing;

a picker drive motor mounted on the picker housing;

a lead member which is reciprocated by the picker drive motor;

a pair of gripper fingers, each of the gripper fingers having a first end which selectively engages a corresponding notch in the cartridge during the cartridge unloading operation and a second end which serves to push the cartridge into the drive during the cartridge loading operation;

a pivot pin for pivotally attaching each of the pair of gripper fingers to the lead member;

a finger pin carried by each of the pair of gripper fingers, the finger pin having a first end which travels along a corresponding one of the pair of cartridge guides;

wherein the picker motor drive effects reciprocation of the lead member and thereby is the sole motor effecting both pivoting of the pair of gripper fingers about the pivot pin and travelling of the finger pins along their respective cartridge guides, for accomplishing both the cartridge load operation and the cartridge unload operation.

2. The apparatus of claim 1, further comprising a drive train which transmits motion from the picker drive motor to the lead element.

3. The apparatus of claim 1, wherein the picker drive motor is operative to rotate a leadscrew, and wherein the lead element is a lead nut which reciprocates in response to rotation of the leadscrew.

4. The apparatus of claim 1, wherein a second end of each of the finger pin has a biasing spring connected thereto, a first end of the biasing spring being connected to a second end of the first finger pin and a second end of the biasing spring being connected to a second end of the second finger pin.

5. The apparatus of claim 1, wherein the second end of the each of the pair of gripper fingers has a roller thereon which rides on the cartridge as it pushes the cartridge into the drive during a cartridge loading operation.

* * * * *